United States Patent
Gu et al.

(10) Patent No.: US 7,254,343 B2
(45) Date of Patent: Aug. 7, 2007

(54) METHOD AND APPARATUS FOR DATA RECOVERY IN AN OPTICAL TRANSMISSION SYSTEM

(75) Inventors: Zheng Gu, Paderborn (DE); Lothar Benedict Erhard Josef Moeller, Middletown, NJ (US); Andreas Thiede, Paderborn (DE)

(73) Assignee: Lucent Technologies Inc., Murray Hill, NJ (US)

( * ) Notice: Subject to any disclaimer, the term of this patent is extended or adjusted under 35 U.S.C. 154(b) by 660 days.

(21) Appl. No.: 10/424,964

(22) Filed: Apr. 28, 2003

(65) Prior Publication Data

US 2004/0213586 A1    Oct. 28, 2004

(51) Int. Cl.
    *H04B 10/00* (2006.01)
(52) U.S. Cl. .................. 398/164; 398/155; 398/212
(58) Field of Classification Search ........ 398/202–214, 398/155, 164; 385/88
See application file for complete search history.

(56) References Cited

U.S. PATENT DOCUMENTS

| | | | | |
|---|---|---|---|---|
| 4,789,994 | A * | 12/1988 | Randall et al. | 375/233 |
| 6,430,715 | B1 * | 8/2002 | Myers et al. | 714/704 |
| 2002/0122504 | A1 * | 9/2002 | Payne et al. | 375/317 |
| 2002/0167707 | A1 * | 11/2002 | Oomori et al. | 359/189 |
| 2003/0170022 | A1 * | 9/2003 | Josef Moeller | 398/27 |

OTHER PUBLICATIONS

Bulow, et al., "PMD Mitigation at 10 Gbit/s Using Linear and Nonlinear Integrated Electronic Equaliser Circuits," Electronics Letters, Jan. 20, 2000, vol. 36, No. 2, pp. 163-164.
Moller et al., "ISI Mitigation Using Decision Feedback Loop Demonstrated with PMD Distorted 10Gbit/s Signals," Electronics Letters, Nov. 25, 1999, vol. 35, No. 24, pp. 2092-2093.
Winters et al., "Electrical Signal Processing Techniques in Long-Haul Fiber-Optic Systems," IEEE Transactions on Communications, vol. 38, No. 9, Sep. 1990, pp. 1439-1453.
Winters et al., "Adaptive Nonlinear Cancellation for High-Speed Fiber-Optic Systems," Journal of Lightwave Technology, vol. 10, No. 7, Jul. 1992, pp. 971-977.

* cited by examiner

*Primary Examiner*—Dzung Tran

(57) ABSTRACT

Method and apparatus for reducing intra-channel distortions of received data resulting from non-linear signal propagation includes parallel detection subcircuits for determining output values of sequentially provided optical data bits such that each of the sequentially provided optical data bits is processed by only one of the parallel detection subcircuits. Two parallel detection subcircuits process the input optical data bits according to even valued and odd valued clock signals. Each subcircuit has first and second signal analyzers to detect the value of the input optical data bit and a first memory unit and a second memory unit connected to the first and second signal analyzers. The input value of clock information provided to the first and second memory units of the first parallel subcircuit are 180° out of phase with input values indicative of a clock speed provided to the second parallel subcircuit.

10 Claims, 3 Drawing Sheets

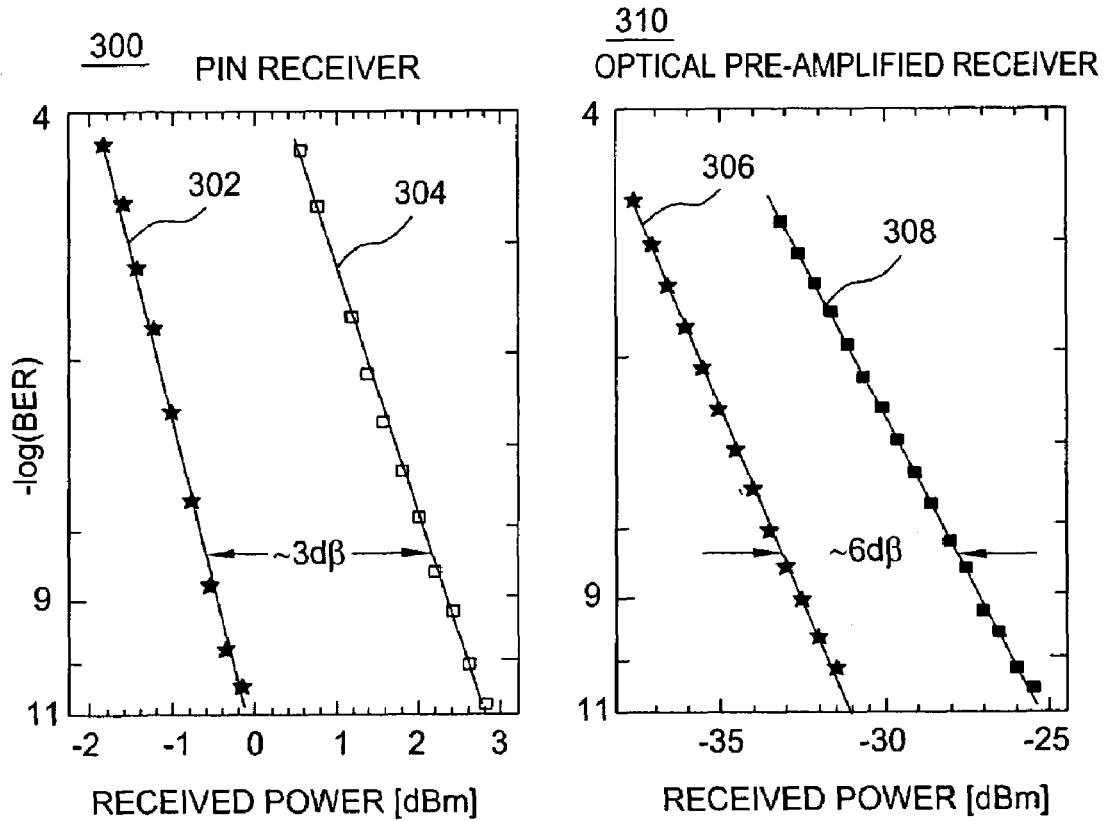
FIG. 3A
FIG. 3B
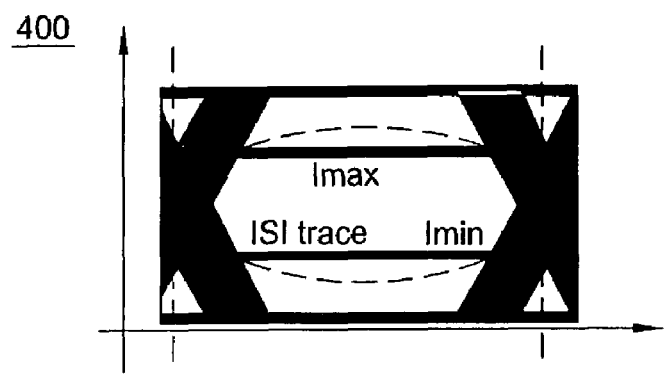
FIG. 4

METHOD AND APPARATUS FOR DATA RECOVERY IN AN OPTICAL TRANSMISSION SYSTEM

FIELD OF INVENTION

This invention relates to the field of optical transmission systems and, more specifically, to improving the data recovery in such optical transmission systems via electrical decision feedback.

BACKGROUND OF INVENTION

The maximum reach of long haul on-off keying transmission systems (such as a wavelength division multiplexed (WDM) transmission system operating at 20 Gbits/s or above) is typically limited by three types of signal distortion. Examples of such distortions are optical-to-signal noise ratio (OSNR) degradation, cross-talk and intersymbol interference (ISI). For the purposes of this discussion, ISI-related distortion are of further interest. ISI occurs when received data pulses are altered by pulse broadening or multi-path propagation (e.g., reflections) in the channel in which they travel. Pulse broadening can occur because of chromatic or polarization mode dispersions or receiver bandwidth limitations as described below. The results of such interference result in poor transmission characteristics.

One specific transmission characteristic that can drastically limit transmission in high-bit-rate systems, particularly for standard single-mode fibers (SSMF), is pulse-spreading type of ISI. This condition is shown in FIGS. 1a and 1b. Specifically, FIG. 1a depicts a graph 100 of the signal intensity I over time T for an input fiber of a WDM transmission system. The graph 100 is broken up into bit slots (denoted by sections 102, 104 and 106, respectively) which define the time slots available for data to be transmitted in such a system. At a first bit slot, bit slot 102, a "1" data bit (encoded in a non-return to zero (NRZ) format) is being transmitted followed by a "0" data bit in a second bit slot, bit slot 104. In a perfect WDM transmission system with perfectly formed fibers, the output intensity of these data pulses would be identical to the input data pulses shown in graph 100. Unfortunately, due to the above-identified interference conditions (pulse-spreading and the like), the signal sent to the output fiber is not identical to the signal sent to the input fiber.

More specifically, a graph of the signal intensity at the output fiber is seen in graph 120 of FIG. 1b. The graph 120 shows the same bit slots 102, 104 and 106 after the "1" and "0" data bits have passed through the transmission system. The resultant data stream is more rounded and not as well defined in the first bit slot 102 for the "1" data bit and furthermore extending into the second bit slot 104 which must represent the "0" data bit. ISI occurs when pulses propagating in the fiber spread out and overlap with each other. This condition can occur due to any of the above-described dispersion (or other) phenomena or by the bandwidth of a particular receiver being smaller than the system data rate (i.e., a 10 Gbits/s signal received by a 8 Gbit/s bandwidth limited receiver). The overlap, along with fiber nonlinearity, creates the ISI at locations of the "0" bits in a sequence of pulses, representing logical "1's" and "0's". If the ISI becomes too large, it is detected by a receiver as logical "1's", which can lead to transmission errors. These deleterious transmission characteristics are evidenced at the 10 Gbit/s transmission rate. As the bit rates of such a WDM transmission system increases, (i.e., for 20 Gbit/s, 40 Gbit/s and higher), the pulse broadening and subsequent ISI severely restricts the usable bandwidth of the system.

Methods of mitigating ISI and the effects it has on circuitry is found in various references including J. H. Winters, R. D. Gitlin, "Electrical Signal Processing Techniques in Long-haul Fiber-optic Systems", IEEE Transactions on Communications, Vol. 38, Issue 9, September 1990, pp. 1439-1453; L. Möller, A. Thiede, S. Chandrasekhar, W. Benz, M. Lang, T. Jakobus, M. Schlechtweg, "ISI Mitigation Using Decision Feedback Loop Demonstrated with PMD Distorted 10 Gbit/s signals", Electronics Letters, Nov. 25, 1999, Vol. 35, No. 24, pp. 2092-2093; H. Bülow, F. Buchali, W. Baumert, R. Ballentin, T. Wehren, "PMD Mitigation at 10 Gbit/s Using Linear and Nonlinear Integrated Electronic Equaliser Circuits", Electronics Letters, Jan. 20, 2000, Vol. 36, No. 2, pp. 163-164; and J. H. Winters, S. Kasturia, "Adaptive Nonlinear Cancellation for High-speed Fiber-optic Systems", IEEE Journal of Lightwave Technology, Vol. 10, No. 7, July 1992, pp. 971-977. However, as bit rates increase, such solutions will not be able to adequately compensate for the inevitable signal distortions.

As such, there remains a need for optical fiber transmission systems that can handle high-capacity communications while reducing the deleterious consequences of linear and/or non-linear distortions and PMD.

SUMMARY OF THE INVENTION

The present invention advantageously provides an apparatus for reduction of intra-channel distortions of received data resulting from linear and/or non-linear signal propagation. In one embodiment of the invention, the apparatus includes a plurality of parallel detection subcircuits for determining output values of a plurality of sequentially provided input optical data bits such that each of said sequentially provided input optical data bits is processed by only one of said plurality of parallel detection subcircuits. Such an embodiment may further contain two parallel detection subcircuits that respectively process the input optical data bits according to even valued and odd valued clock signals. Each subcircuit of the apparatus has first and second signal analyzers to detect the value of the input optical data bit. Each subcircuit includes a first memory unit and a second memory unit connected respectively to its first and second signal analyzers. The memory units are also provided with an input value indicative of a circuit clock speed. In one embodiment, input value of clock information provided to the first and second memory units of the first parallel subcircuit are 180° out of phase with input values indicative of a clock speed provided to the second parallel subcircuit.

BRIEF DESCRIPTION OF THE DRAWINGS

The teachings of the present invention can be readily understood by considering the following detailed description in conjunction with the accompanying drawings, in which:

FIG. 3a is a graph of the bit error rate versus received power for a first type of receiver in an optical transmission system that is recovering data in accordance with the subject invention;

FIG. 3b is a graph of bit error rate versus received power for a second type of receiver in an optical transmission system that is recovering data in accordance with the subject invention; and FIG. 4 depicts an eye diagram of an ISI distorted signal that is improved by the subject invention.

To facilitate understanding, identical reference numerals have been used, where possible, to designate identical elements that are common to the figures.

DETAILED DESCRIPTION OF THE INVENTION

Figure 1A:
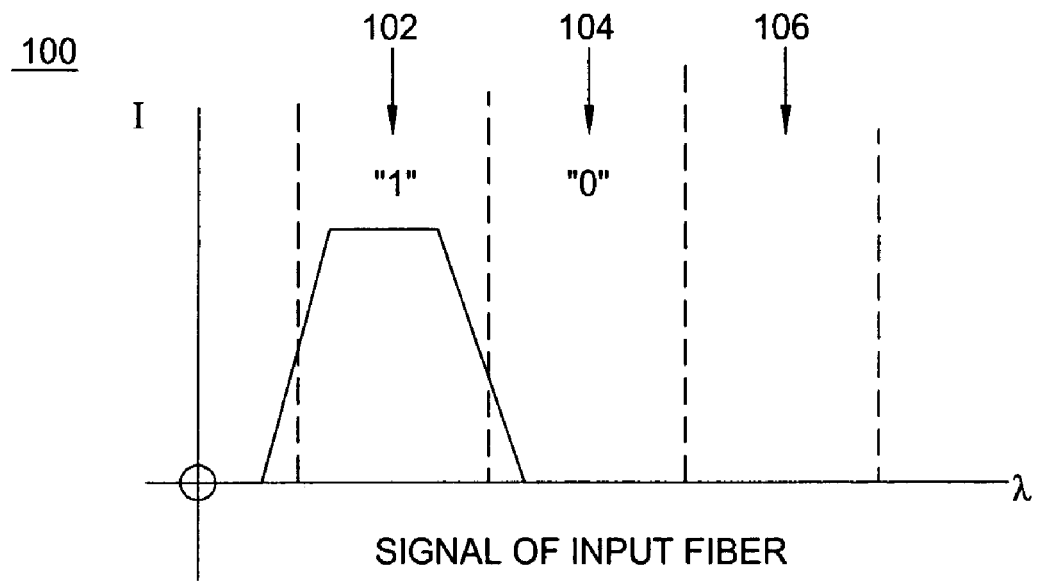
FIG. 1a depicts a graph of input power versus time for a data signal of the prior art.
Figure 1B:
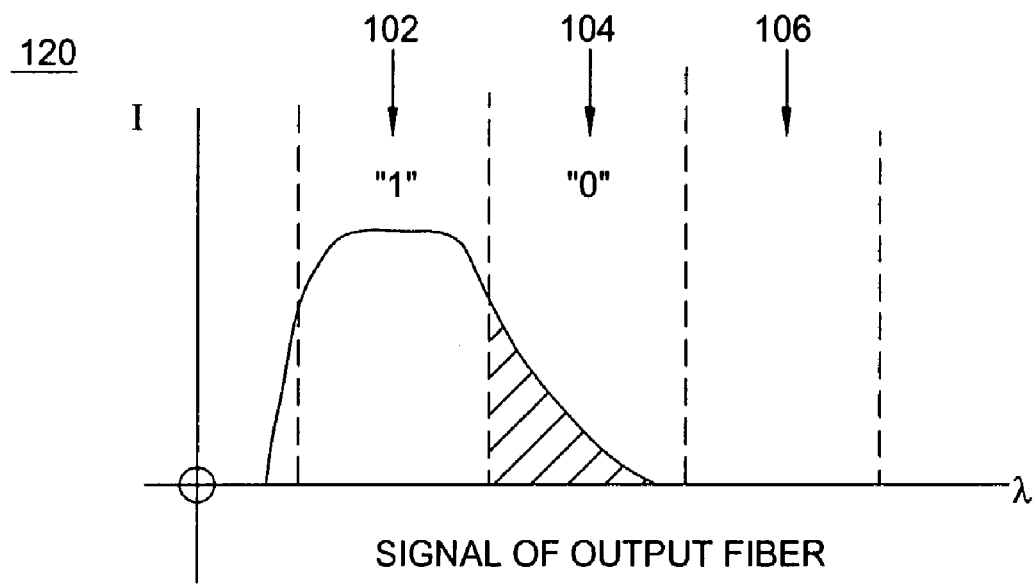
FIG. 1b depicts a graph of output power versus time for a data signal of the prior art.
Figure 2A:
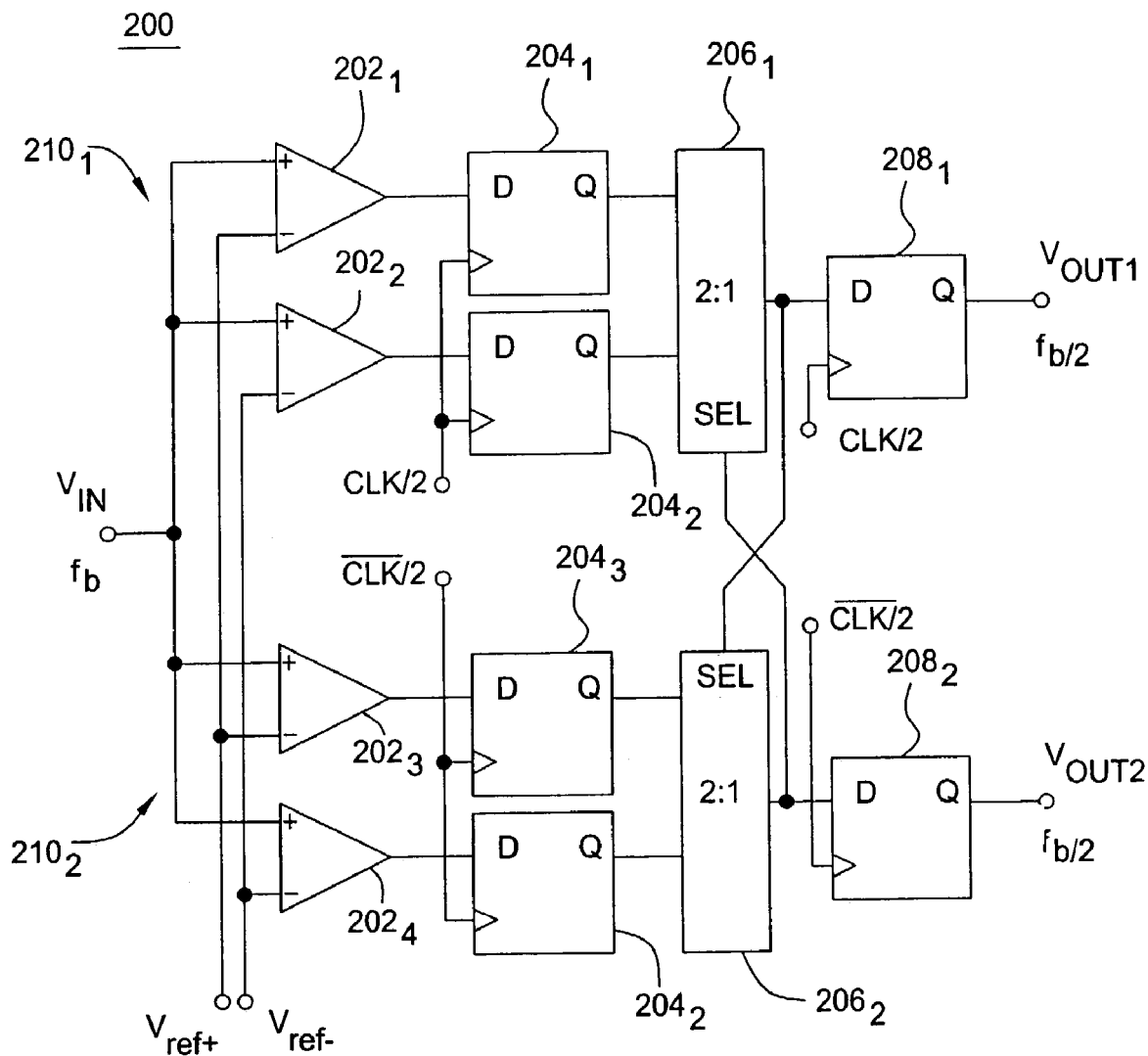
FIG. 2a depicts a circuit diagram of an apparatus for improved data recovery in accordance with the subject invention.

FIG. 2a depicts a circuit diagram of a decision feedback equalizer (DFE) 200 in accordance with the subject invention. The DFE 200 of the subject invention is capable of accepting electrical input data signals $V_{in}$ based upon optical data signals, appropriately converted, and analyzing such data at a variety of circuit elements to output an appropriately recovered data signal component $V_{out1}$ or $V_{out2}$. More specifically, the DFE 200 compares the incoming data $V_{in}$ to reference voltages denoting threshold detection points for data analysis. Dependent upon clock signaling and the prior data bit value, the DFE 200 will output the data signal component at either a first data output line $V_{out1}$ or a second data output line $V_{out2}$. The configuration of the DFE 200 is such that it facilitates processing of a data pulse stream (i.e., the incoming data signal $V_{in}$) of 10 Gbits/s and higher (e.g., 20 Gbits/s, 40 Gbits/s and the like) by splitting the incoming signal $V_{in}$ into odd and even clock valued bits. As such, corresponding odd and even clock value actuated detection subcircuits are operating at only half of the transmission system data rate. The reader should note that FIG. 2a represents a simplified drawing of the circuit of the subject invention. Specifically, each line that connects circuit elements actually represents two lines, each of which carry complementary values of the signal traveling along the depicted line. Additional details are provided in the following description where necessary.

The DFE 200 comprises a plurality of parallel detection subcircuits $210_n$ for processing incoming data pulses $V_{in}$. In one embodiment of the subject invention, a first parallel subcircuit $210_1$ and a second parallel subcircuit $210_2$ are provided. Each subcircuit $210_n$ further comprises a plurality of input analyzers $202_n$. The signal analyzers $202_n$ compare the incoming data $V_{in}$ to threshold references ($V_{ref+}$ and $V_{ref-}$) in order to accurately recover data from $V_{in}$. As discussed above, each line in the depicted circuit represents two lines of complementary input. Accordingly, each signal analyzer $202_n$ has four actual inputs that are represented by the two depicted inputs. For example, the line carrying $V_{in}$ to first signal analyzer $202_1$ is actually one line connecting $V_{in}$ to a non-inverting input ($V_{in+}$) and a second line connecting $V_{in}$ to an inverting input on the first signal analyzer $202_1$ ($V_{in-}$). The line carrying $V_{ref+}$ on the first signal analyzer $202_1$ is actually one line connecting $V_{ref+}$ to a non-inverting input on the first signal analyzer $202_1$ ($V_{ref+}$)+ and a second line connecting $V_{ref+}$ to an inverting input on the first signal analyzer $202_1$ ($V_{ref+}$)–for a total of four inputs. Similar connections are made to the second, third and fourth signal analyzers $202_2$, $202_3$ and $202_4$, respectively. The results of the signal analyzers $202_n$ are passed on to a plurality of memory devices $204_n$.

In the first subcircuit $210_1$, the first signal analyzer $202_1$ receives data $V_{in}$ and compares it to an upper detection threshold ($V_{ref+}$) and sends the results to first memory unit $204_1$. A second signal analyzer $202_2$ receives input from $V_{in}$ and compares it to a lower detection threshold reference ($V_{ref-}$). The result of the second signal analyzer $202_2$ is passed on to second memory device $204_2$. More specifically, each signal analyzer $202_n$ has two outputs (represented by the single output line shown). Each memory device $204_n$ has a non-inverting input D+ to accept one of the signal analyzer outputs and an inverting input D− to accept another of the signal analyzer outputs. Each of the plurality of memory devices $204_n$ is also provided with input that is correlated to the timing of the transmission system. In one embodiment, the memory devices $204_n$ are provided with input timing pulses at timing intervals that are half of the system clock rate (CLK/2).

The single CLK/2 line represents two clock inputs (CLK/2)+ and (CLK/2)− applied to each memory device $204_n$. The specific and strategic reason for designing the circuit with a complementary line configuration is that at the high operational speed of the circuit, it is easier to decide about the difference between two voltages (applied signals) than to decide about their absolute value. In other words, common mode distortions are more easily suppressed with the described configuration. The output of each of the plurality of memory units $204_n$ is provided to a selector unit $206_n$. Specifically, and in one embodiment, the output from first memory device $204_1$ and the output of second memory device $204_2$ is provided to first selector $206_1$.

The second subcircuit $210_2$ is similarly configured and wired as the first subcircuit $210_1$. Specifically, a third signal analyzer $202_3$ receives inputs from $V_{in}$ and upper threshold reference $V_{ref+}$ and outputs the results to third memory device $204_3$. Similarly, fourth signal analyzer $202_4$ is provided with input from $V_{in}$ and the lower detection threshold ($V_{ref-}$). The output of fourth signal analyzer $202_4$ is provided as input to a fourth memory device $204_4$. Each of the third and fourth memory devices $204_3$ and $204_4$ are also provided with input timing pulses that are correlated to the transmission system timing. Specifically, and in one embodiment, second subcircuit $210_2$ is provided with input timing pulses at timing intervals that are half of the system clock. However, these timing pulses are opposite or 180° out of phase with pulses provided to the first subcircuit $210_1$ (i.e., $\overline{CLK/2}$). Outputs from the third and fourth memory units $204_3$ and $204_4$ are provided to a second selector $206_2$.

The selector 206 from each subcircuit $210_n$ is crosswired to its counterpart in the other subcircuit. In this manner, each subcircuit $210_n$ is connected to its parallel counterpart so that each subcircuit controls the selection for the next bit in the other subcircuit $210_n$. The output from each selector $206_1$ and $206_2$ is provided as input to first and second secondary memory units $208_1$ and $208_2$, respectively. First secondary memory unit $208_1$ is provided with an input clock signal one half the clock rate of the transmission system (CLK/2). Second secondary memory unit $208_2$ is provided with an input clock signal one half the clock rate of the transmission system but at 180° out of phase with the first subcircuit $210_1$ ($\overline{CLK/2}$). Accordingly, if the input data pulse at $V_{in}$ is an odd clock valued data pulse, its recovered output can be found at $V_{out1}$. If incoming data $V_{in}$ is an even clock valued data pulse, the output can be found out at $V_{out2}$. Effectively, each subcircuit $210_n$ divides the data recovery tasks so that each subcircuit $210_n$ is only working at one half the system clock rate (CLK typically 10, 20 Gbits/s or higher).

The DFE 200 of FIG. 2a, is created using a plurality of switching and logic components. In one embodiment, the DFE 200 is realized using an enhancement-depletion AlGaAs/GaAs HEMT technology with a 0.2 μ gate length and a threshold frequency of about 60 GHz. Optionally, the DFE 200 is built in source-coupled FET logic for better common-mode noise rejection and high speed circuit operation. Differential coplanar waveguides are implemented on a single chip for providing both clock pulses and data pulses to the circuit 200. In one particular example, the entire DFE circuit 200 comprises approximately 310 FETs on a chip area of approximately 2.5 mm² and operates at a power consumption level of approximately 1.9 W. Accordingly, the subject invention has the capabilities of providing differential feedback equalization to a 20 Gbits/s signal. This design takes advantage of parallel signal processing which reduces electrical bandwidth requirements of the circuit while increasing the gain of a received signal with greater accuracy then previously realizable. One skilled in the art can also understand that since the typical delays associated with a basic feedback loop configuration have been eliminated, incoming signal rates of up to 20 Gbits/s and higher can be processed with the same or better results than the processing of slower signals in the conventional manner.

Figure 2B:
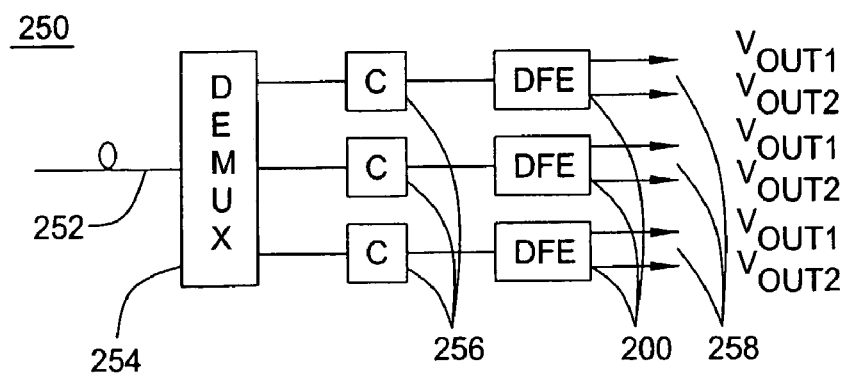
FIG. 2b depicts a block diagram of an optical receiver comprising the apparatus of the subject invention.

Another embodiment of the invention is seen in FIG. 2b depicting an optical receiver 250 incorporating the DFE 200. Specifically, optical receiver 250 receives a train of broad spectrum (WDM) optical data pulses from transmission line 252. The pulses are provided to a demultiplexer 254 which segregates the broad spectrum pulses into individual wavelength pulses. The optical receiver may or may not incorporate a single broad spectrum or individual wavelength amplifiers (not shown, but understood by those skilled in the art) to improve incoming pulse quality prior to further processing. Subsequent to demultiplexing, the individual wavelength pulses are provided to a plurality of converters 256 which convert the optical signal into an electrical signal (a logical "1" or "0"). These electrical signals are then provided to a plurality of DFE's 200 for analysis and data recovery as described to provide a plurality of data recovered electrical signals 258.

There are several types of optical data receivers, which can benefit from the above-identified DFE. More specifically, two basic types of optical data receivers are a PIN receiver and an optically pre-amplified receiver. Typically, PIN receivers include, among other components, a photodiode for receiving optical data signals from a transmission line followed by an electrical amplifier. Such a receiver configuration introduces a certain amount of terminal noise into the received signal prior to threshold detection (or recovery); hence, such a receiver requires a relatively higher degree of received power than an optically pre-amplified receiver. The optically pre-amplified receiver contains, among other components, an optical amplifier which receives optical data signals from a transmission line and amplifies them. Subsequent to optical pre-amplification, the received data signal is passed through a band-pass filter (BPF) so as to filter undesirable optical components and sharpen the received signal. Subsequent to band-pass filtering, the received signal is passed to a photodiode which converts the optical signal into an electrical signal.

The performance gain of a PIN and optically pre-amplified receivers with implemented DFE is described as follows. For PIN receivers, symbol independent thermal noise is the main noise source. For optically pre-amplified receivers, the signal-ASE beat noise becomes dominant. Consequently there will be different performance gains for DFE operation in both receiver types. The amount of InterSymbol Interference (ISI) in both receivers in the examples was the same. For the purpose of equalization gain estimation, FIG. 4 shows an eye diagram 400 of an ISI distorted NRZ signal. For a PIN receiver, the Q factor of the unequalized signal is given by $$Q \approx \left(\frac{I_{\max} - I_{\min}}{2\sigma_{th}}\right)$$

where $I_{max}$, $I_{min}$ and $\sigma_{th}$ stand for the inner eye borders (traces) and the variance of the thermal noise respectively. Perfect cancellation of the trace representing $I_{min}$ by means of the DFE would improve the receiver sensitivity by a penalty reduction of $$\Delta = -20\log\left\lfloor\frac{Q_{DFE}}{Q_{ISI}}\right\rfloor = -20\log\left\lfloor\frac{I_{\max} - I_{\min}}{I_{\max}}\right\rfloor$$

In the case of an optically pre-amplified receiver, the noise variance becomes symbol dependent. Good approximations for Q factors with and without DEE operation are then given by $$Q \approx \frac{I_{\max} - I_{\min}}{X_{ASE}\sqrt{I_{\max}} + X_{ASE}\sqrt{I_{\min}}}$$

$$Q_{DFE} \approx \frac{I'_{\max}}{X_{ASE}\sqrt{I'_{\max}} + X_{ASE}\sqrt{I'_{\min}}}$$

$$\Delta = 10\log\left\lfloor\frac{I_{\max}}{I'_{\max}}\right\rfloor\Bigg|_{Q_{DFE}=Q}$$

where $X_{ASE}$ is a parameter that describes the signal ASE beat noise. When assuming that $I_{Imax}$ and $I_{min}$ are proportional to each other, the penalty reduction in the case of the optically pre-amplified receiver is expected to be twice than that for the PIN receiver. Also the ISI amount can be estimated after the penalty is measured.

In one example, a 20 Gb/s signal was generated by polarization multiplexing of two orthogonally polarized and de-correlated 10 Gb/s 33% RZ data streams. By time interleaving of the $2^{31}-1$ PRBS data streams with 50 ps phase offset the ISI was minimized. A lightwave converter with relative small electrical bandwidth was used to detect the 20 Gb/s signal. After launching the signal to the decision circuit that included a 2:1 electrical de-mux, the bit error rate measurement was performed at 10 Gb/s data rate. FIG. 3 depicts graphs denoting the characteristics of each type of receiver described above. Specifically, FIG. 3a shows a graph 300 plotting received power of a PIN receiver versus the bit error rate (in logarithmic scale). FIG. 3b depicts a graph 310 plotting received power of an optically pre-amplified receiver versus the bit error rate (in logarithmic scale). First line 302 (corresponding to the star data points) denote the received power versus bit error rate with a DFE equipped PIN receiver, while a line at 304 (corresponding to the square data points) reflects the same characteristics without DFE. Inspection readily reveals that it is possible to lower the power of a transmitted data signal to the PIN receiver simply by virtue of DFE recovery techniques as described in the subject invention. Similarly, FIG. 3b shows similar lines for a pre-amplified receiver. That is, line 306 (corresponding to the star data points) reveals a lower power of a transmitted signal to the optically pre-amplified receiver with DFE than that of a line at 308 (corresponding to the square data points) of such receiver not using DFE. Specifically, the gain from feedback equalization from the subject invention was about 3 DB for the PIN receiver and about twice that for the optically pre-amplified receiver. This is in good agreement with the derivations. The experimental result estimates the ISI to be about 50% (0.5 $I_{max} \approx I_{min}$) in front of the decision element without feedback operation. From this we conclude the overall electrical bandwidth of the front end to be around 10 GHz. Accordingly, the results shown herein indicate that there is an improvement in systems using the DFE of the subject invention in that the received power of a transmitted data signal can be reduced and yet still maintain accurate data recovery.

Although various embodiments that incorporate the teachings of the present invention have been shown and described in detail herein, those skilled in the art can readily devise many other varied embodiments that still incorporate these teachings.

What is claimed is:

1. An apparatus comprising:
    a plurality of parallel detection subcircuits for determining output values of a plurality of sequentially provided electrical representations of optical data bits, the plurality of parallel detection subcircuits comprising a first parallel detection subcircuit and a second parallel detection subcircuit wherein the first and second parallel subcircuits each further comprise a first signal analyzer and a second signal analyzer and said first and said second parallel subcircuits each further comprise a first memory unit and a second memory unit connected respectively to said first signal analyzer and said second signal analyzer, and a selective multiplexer receiving signals from each of said first memory unit and said second memory unit wherein the multiplexer provides output to a third memory unit and an trigger of the multiplexer of the corresponding parallel subcircuit adjacent thereto;
    each of said sequentially provided electrical representations of optical data bits being processed by only one of said plurality of parallel detection subcircuits.

2. The apparatus of claim 1 wherein the first parallel detection subcircuit processes the optical data bits according to even valued clock signals.

3. The apparatus of claim 1 wherein the second parallel detection subcircuit processes the optical data bits according to odd valued clock signals.

4. The apparatus of claim 1 wherein each of said first signal analyzer and said second signal analyzer detect the value of the optical data bit.

5. The apparatus of claim 1 wherein said first memory unit and said second memory unit are provided with an value indicative of a circuit clock speed.

6. The apparatus of claim 5 wherein the value provided to the first and second memory units of the first parallel subcircuit are 180° out of phase with values indicative of a clock speed provided to the second parallel subcircuit.

7. The apparatus of claim 1 wherein the third memory unit also receives an value indicative of circuit clock speed.

8. Apparatus comprising:
    a first parallel detection subcircuit for detecting values of a first plurality of sequentially provided optical data bits; and
    a second parallel detection subcircuit for detecting values of a second plurality of sequentially provided optical data bits, wherein the first parallel detection subcircuit processes the optical data bits according to even valued clock signals and the second parallel detection subcircuit processes the optical data bits according to odd valued clock signals.

9. Apparatus comprising:
    a demultiplexer for demultiplexing an WDM optical signal into a plurality of single wavelength signals;
    a plurality of converters for converting the single wavelength optical signals into a corresponding plurality of electrical signals; and
    a data recovery unit for analyzing and processing the plurality of corresponding electrical signals; wherein each of two sequential electrical signal is processed by a different one of at least two alternate subcircuits.

10. The apparatus of claim 9 wherein the data recovery unit further comprises:
    a first parallel detection subcircuit for detecting values of a first plurality of sequentially provided electrical signals; and
    a second parallel detection subcircuit for detecting values of a second plurality of sequentially provided electrical signals, wherein the first parallel detection subcircuit processes the electrical signals according to even valued clock signals and the second parallel detection subcircuit processes the electrical signals according to odd valued clock signals.

* * * * *